United States Patent [19]
Akutsu

[11] Patent Number: 5,857,600
[45] Date of Patent: Jan. 12, 1999

[54] PORTABLE CASE

[75] Inventor: Akira Akutsu, Tokyo, Japan

[73] Assignee: Fumi Akutsu, Tokyo, Japan

[21] Appl. No.: 823,242

[22] Filed: Mar. 24, 1997

[30] Foreign Application Priority Data

| Sep. 30, 1996 | [JP] | Japan | 8-28898 |
| Sep. 30, 1996 | [JP] | Japan | 8-28899 |
| Sep. 30, 1996 | [JP] | Japan | 8-28900 |
| Nov. 26, 1996 | [JP] | Japan | 8-35631 |
| Nov. 26, 1996 | [JP] | Japan | 8-35632 |
| Nov. 26, 1996 | [JP] | Japan | 8-35633 |
| Nov. 26, 1996 | [JP] | Japan | 8-35634 |
| Nov. 26, 1996 | [JP] | Japan | 8-35635 |
| Nov. 26, 1996 | [JP] | Japan | 8-35636 |
| Jan. 9, 1997 | [JP] | Japan | 9-260 U |

[51] Int. Cl.$^6$ .................. A45F 3/00; B62J 9/00
[52] U.S. Cl. .......... 224/240; 224/183; 224/235; 224/241; 224/674; 224/610; 224/654; 224/413; 224/439; 224/42.11; 224/680; 224/268; 224/930; 383/42; 383/86
[58] Field of Search ................ 224/240, 241, 224/236, 235, 237, 183, 679, 904, 674, 675, 610, 654, 655, 413, 435, 439, 42.11, 680, 268, 930; 150/119, 118; 383/42, 84, 86; 220/343

[56] References Cited

U.S. PATENT DOCUMENTS

| D. 206,983 | 2/1967 | Knight | 224/236 |
| D. 232,135 | 7/1974 | Dodson | 224/240 |
| 1,506,596 | 8/1924 | McMurdie | 220/343 |
| 3,051,130 | 8/1962 | Morris | 224/236 |
| 3,769,733 | 11/1973 | Nelson | 224/239 |
| 4,928,823 | 5/1990 | Campbell | 224/679 |

FOREIGN PATENT DOCUMENTS

| 138 755 | 2/1920 | United Kingdom | 224/241 |
| 695 734 | 8/1953 | United Kingdom | 150/119 |

*Primary Examiner*—Linda J. Sholl
*Attorney, Agent, or Firm*—Howson & Howson

[57] ABSTRACT

A portable case for belongings comprises a case body of leather and a cover lid of metal to protect the belongings within the case body. The case body and protective cover lid are hinged together and are disengageable from each other at the hinge so that both case body itself and the cover lid can be replaced with new ones. The case can be used as a carrier for a cigarette lighter or a portable telephone, as a waist bag for miscellaneous articles, as a hand or shoulder bag, as a rucksack, as one of a pair of panniers, and as a tool carrier for a two-wheeled vehicle. A protective cloth bag may be provided on the cover lid, and the cover lid may also be provided with an external key carrier.

13 Claims, 19 Drawing Sheets

PORTABLE CASE

BACKGROUND OF THE INVENTION

The present invention relates to a portable case for belongings, which is able to accommodate cigarette lighters, cigarettes, books, tools, etc., and to panniers to be used on a two-wheeled vehicle.

Generally, a portable case for belongings has a case body, which is able to accommodate small belongings such as cigarette lighters, books, tools, etc., and a cover lid which protects those belongings.

Conventionally, in this type of portable case for belongings, the case body and cover lid are integral with each other, and their material is leather. Japanese Design Registration No. 888,509 discloses a portable case of kind, which is attached to a belt for use.

However, since the case body and cover lid are integral with each other, if only the cover lid is worn out through use, the entirety of the case will not be able to be used. Consequently, the entire case is discarded even though the case body is still usable. That is, there is a problem by which the service life of the portable case is shortened.

Furthermore, since the cover lid is made of leather, there is another problem in that the belongings accommodated in the case may be damaged due to external impacts.

SUMMARY OF THE INVENTION

The present invention addresses the above problems, and it is therefore an object of the invention to provide a portable case having a prolonged service life and good resistance to external impacts, and which is nevertheless of a simple construction.

In order to achieve the above-mentioned objects, the portable case in accordance with the invention has a case body for accommodating belongings and a cover lid to protect the belongings, and is characterized by the fact that the case itself is made of leather, the cover lid is made of metal, and the case and cover lid are disengageable from each other so that either can be replaced without destroying the other. As used herein the term "leather" includes cowhide, tanned leather, and various imitation leathers such as vinyl leathers and the like. The term "metal" includes steel and aluminum, as well as other metals such as silver.

A portable case for belongings is constructed so that the case itself and cover lid are hinged together on a hinge axis, preferably by a metal pin attached to the case body. The pin may be secured to the case body by nuts threaded onto both of its ends.

To facilitate closure of the case, at least part of the cover lid can be made of a magnet. Alternatively, the case itself may be provided with a magnet and, provided that the cover lid is made at least in part of a ferromagnetic material, e.g. steel, the cover lid and case itself are able to be held closed by the action of the magnet, but opened manually against the magnetic attraction force.

The cover lid may be provided with a soft protective cloth. The protective cloth preferably covers substantially the entire cover lid.

The metal cover lid may also have a key holder attached to it.

Any of the above-mentioned cases may be constructed so that the front part of the case body and the cover lid can be brought into facial contact with each other, i.e. contact over a substantial area as distinguished from spot contact over one or more points or small areas.

Any of the above-mentioned cases can also be constructed so that the case body comprises a rear panel having a front face with upper and lower parts, and a pocket secured to the lower part of the front face of the rear panel, so that, even when the cover lid is closed, a through space is provided between the pocket and the cover lid through which air is able to pass freely.

The portable case can be constructed to receive specialized belongings such as a cigarette lighter or portable telephone. In the case of a portable telephone, one side of both the sides of the cover lid may be provided with a notch to allow the antenna of a portable telephone held in the case body to protrude through the notch beyond the cover lid.

The case body may be provided with a belt loop secured to its rear face so that the case can be worn as a waist bag, which may be capable of accommodating a plurality of belongings. Alternatively, an attaching belt can be secured to the rear face of the case body, so that the portable case can be used as a tool bag for attachment to a motorcycle, etc.

The portable case may also include adjustable means for securing the cover lid in a closed condition on the case body, so that the case body can accommodate a plurality of selected belongings and the cover lid can be tightened to hold the selected belongings securely.

Two cases can be connected together by a connecting sheet to provide panniers for use on a two-wheeled vehicle. The panniers comprise first and second cases, each comprising a case body for accommodating belongings and a cover lid to protect the belongings, wherein the case bodies are made of leather, the cover lids are made of metal, and each case body and its cover lid are disconnectable from each other. Each case comprises adjustable means for securing its cover lid in a closed condition on its case body, so that the case bodies accommodate a plurality of selected belongings and the cover lids can be tightened to hold the selected belongings securely.

As will be apparent from the above summary, the invention has broad utility as a portable case, and has the advantage that it is possible to remove and replace the metallic cover lid from the leather case body by a simple operation such as removing nuts from a metal hinge pin.

Various other objects and advantages of the invention will be apparent from the following detailed description, when read in conjunction with the drawings.

DETAILED DESCRIPTION

Figure 1:
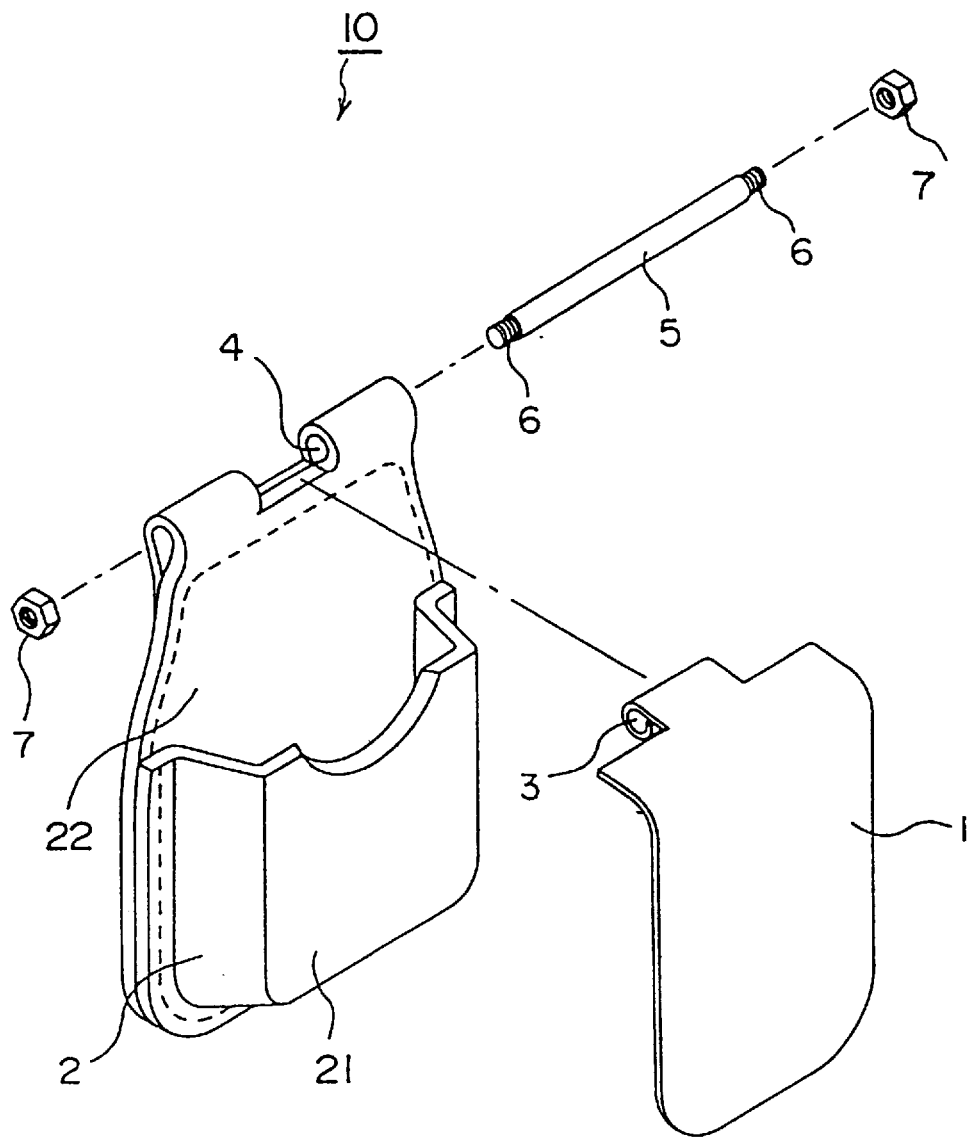
FIG. 1 is an exploded perspective view showing a disassembled portable case according a first embodiment of the invention.

The portable case 10 of FIG. 1 is adapted to hold a cigarette lighter (not shown). It consists of a case body 2 and a cover lid 1. The case body 2 is preferably made of cowhide, but can be made of various other leathers and synthetic leathers. The cover lid 1 is made of metal, for example, steel. The upper part of the cover lid 1 is formed with a knuckle having a through hole 3. The knuckle of the cover lid fits between two spaced knuckles formed at the top of the leather back panel 22 of the case body, and hole 3 in the knuckle of the cover lid is alignable with holes 4 in the knuckles of the case body. A pin 5 is inserted into the respective holes 3 and 4 to link the cover lid and case body together, while allowing the cover lid to pivot about the axis of pin 5 between an opened and a closed condition. Nuts 7 are threaded onto the ends 6 of the pin to secure the pin to the case body.

The principal components of the case body 2 are of the front pocket 21 and rear panel 22, which are stitched together. The front pocket 21 is shaped to accommodate a cigarette lighter.

Figure 2:
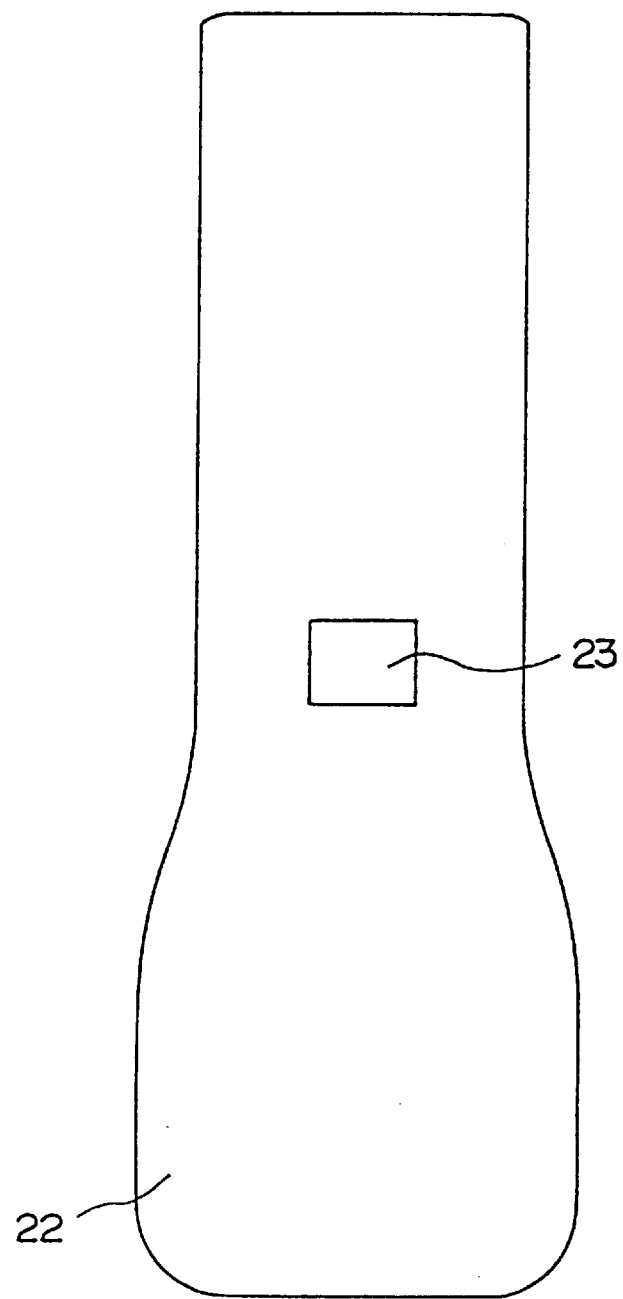
FIG. 2 is a plan view of the rear panel portion of the case body.
Figure 3:
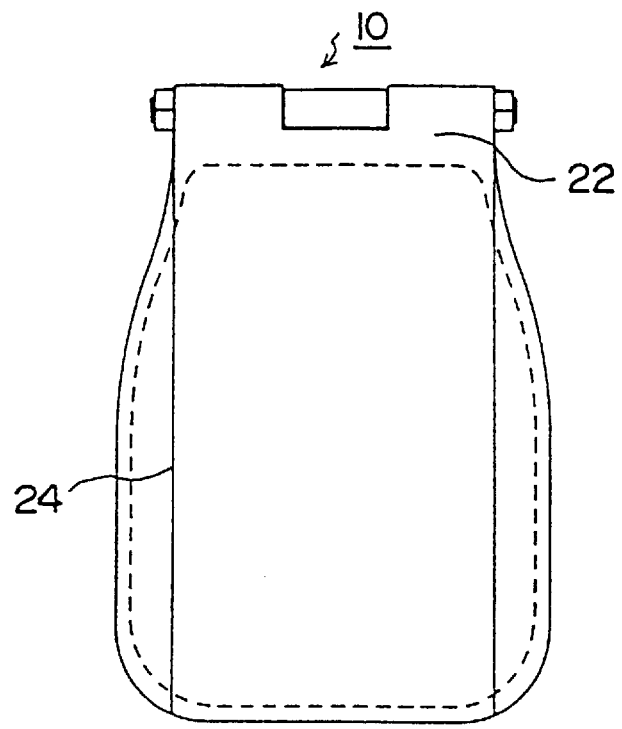
FIG. 3 is a rear elevational view of the portable case of FIG. 1.

The rear panel 22 is formed by folding a single piece of cowhide shaped as shown in FIG. 2, having a rectangular opening 23. The piece of cowhide is folded on itself to form the knuckles having holes 4 (as shown in FIG. 1), and stitched about the periphery of the larger part as shown in FIG. 3. The stitching at the upper and lower parts of FIG. 3 secure the narrower portion of the piece of cowhide to the wider portion to provide the knuckles with holes 4 and also to provide a belt loop 24.

Figure 4:
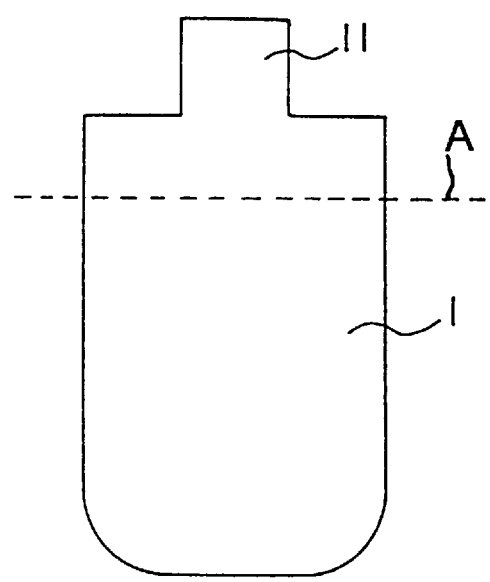
FIG. 4 is a plan view of the cover lid.

The steel cover lid 1, shown in FIG. 1 is formed from a steel plate having a thickness preferably of about 1 mm, and cut to the shape shown in FIG. 4, with a projection 11 at the middle of the upper section of the cover lid. The projection 11 is formed into a knuckle having a hole 3, as shown in FIG. 1. The cover lid 1 is also folded gradually about line A in FIG. 4, so that it is generally L-shaped, with its bend having a large radius of curvature, and so that the part of the cover remote from the hinge can be spaced from rear panel 22 of the case body when the cover lid is in the closed condition. Both corners of the lower part of the cover lid are rounded for safety.

To connect the cover lid 1 to the case 2, steel pin 5 is passed through the hole 3 of the cover lid 1 and holes 4 of the case 2, and nuts 7 are threaded onto the ends of the pin to complete the assembly.

Figure 5:
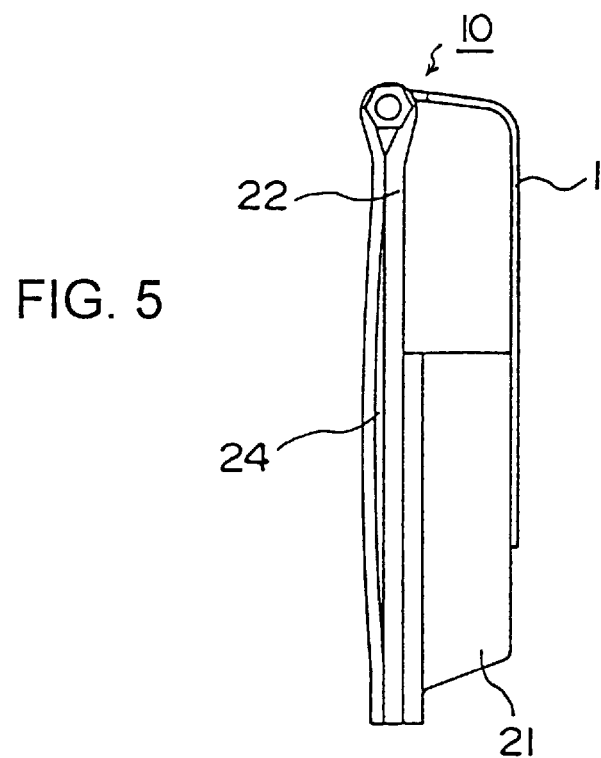
FIG. 5 is a side elevational view of the assembled portable case in its closed condition.

Belt loop 24 is seen in the side elevational view of FIG. 5. The belt loop 24 allows a belt to be attached to the rear panel 22 of the case body.

Figure 6:
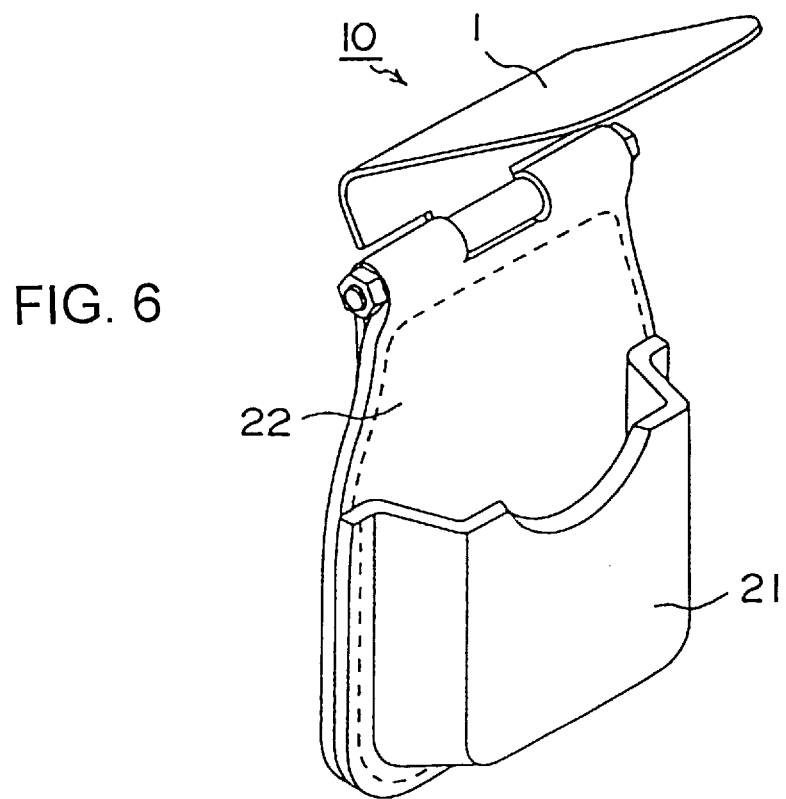
FIG. 6 is a perspective view of the portable case showing the cover lid in an opened condition.

FIG. 6 is a perspective view showing the cover lid in its opened condition. A cigarette lighter or similar article may be accommodated in the accommodation space between the front part of pocket 21 and the rear panel 22 of the case body. When the cover lid 1 is closed, the lighter or other article is protected from damage or loss.

Figure 7:
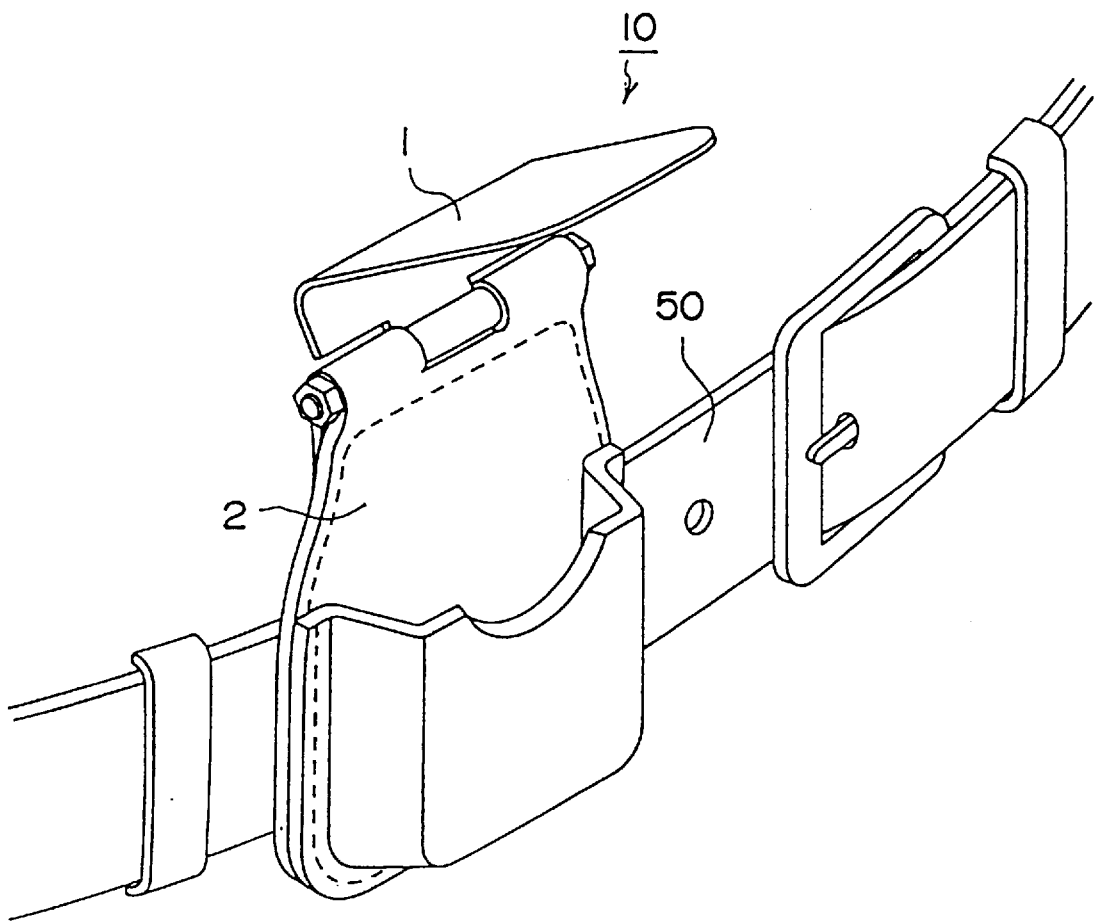
FIG. 7 is a perspective view showing the portable case used as a waist bag.

As seen in FIG. 7, a belt 50 passes through the belt loop 24 at the back of the case 10. When using the case, the cover lid 1 may be opened by a hand, and belongings such as a cigarette lighter, etc. may be taken out. Since the cover lid 1 is made of metal, it retains its shape. Moreover, it is able to return to its closed position due to its own weight. In this embodiment, since the cover lid 1 is not opened unnecessarily, no tightening is required between the case body and the cover lid.

Should the cover lid be damaged during use, one or both of the nuts 7 are loosened to remove the pin 5, and the cover lid can be replaced with a new one.

Thus, a portable case for belongings according to the invention is constructed with a metal cover lid, which changeable by a simple mechanism, able to be used for a longer period of time than conventional covers, resistant to external impacts and able to protect the belongings accommodated in the case fully and effectively.

Furthermore, in a case where the belonging is a cigarette lighter, there is an advantage that the remaining heat of a cigarette lighter after use is easily dissipated through the metallic cover lid.

Figure 8:
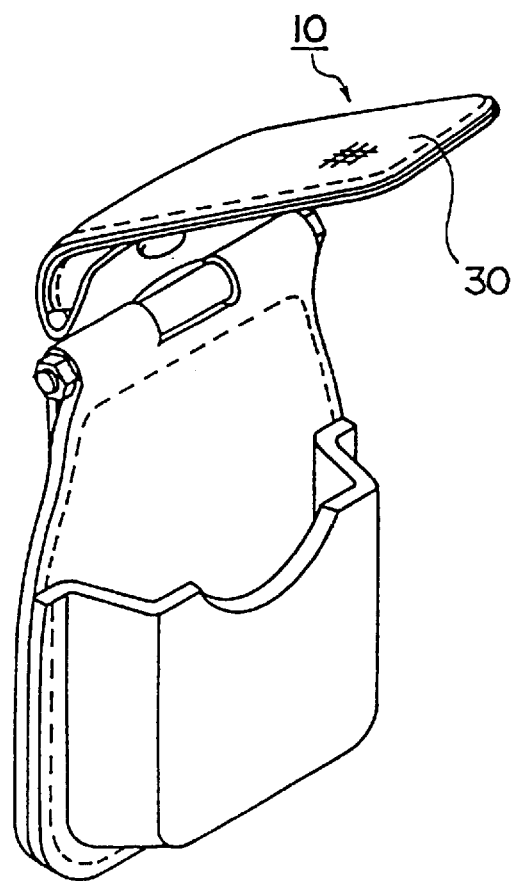
FIG. 8 is a perspective view of a portable case in which the cover lid is provided with a protective cover.

In FIG. 8, which shows a preferred embodiment of a portable case according to the invention, the cover lid 1 is provided with a protection bag 30. Covering the lid with the protection bag 30 ensures longer use of the case by reducing the likelihood of damage to the lid.

Figure 9:
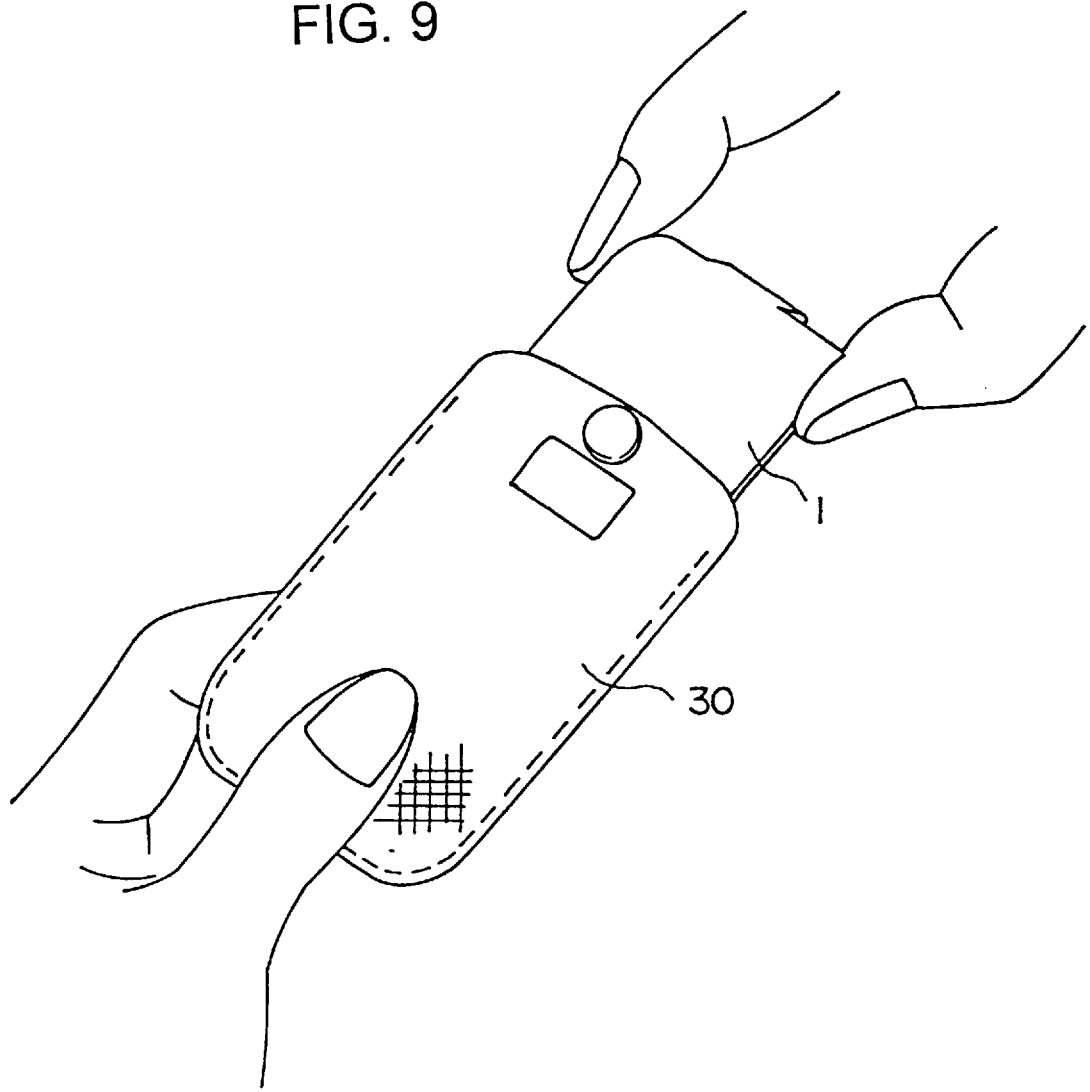
FIG. 9 is a perspective view illustrating the attachment of a protective cover to the cover lid.
Figure 10:
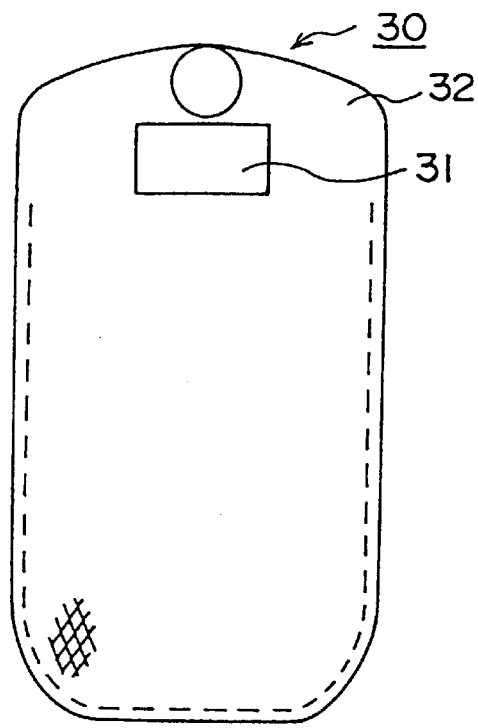
FIG. 10 is an elevational view of the front of the protective cover.
Figure 11:
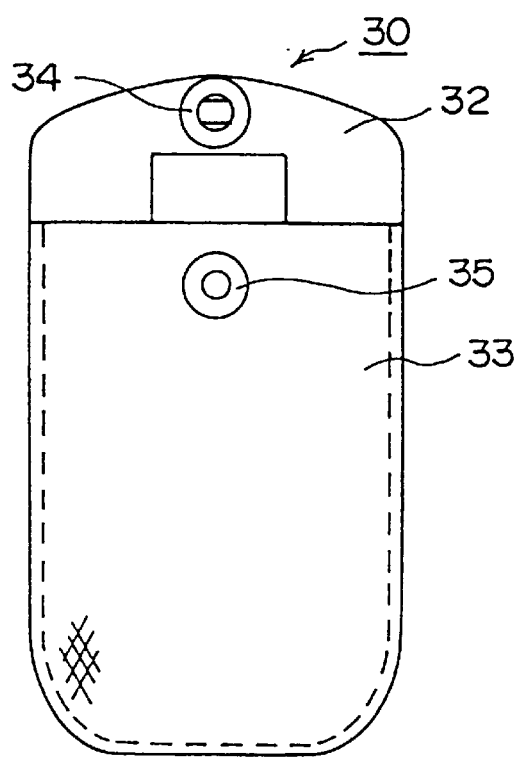
FIG. 11 is an elevational view of the rear of the protective cover.

The structure of the protection bag 30 and the manner in which it is installed on the cover lid are shown in FIGS. 9–11.

The protection bag 30 is made from two pieces of soft cloth and is a little larger than the cover lid 1 of the case 10. The front and back sides of the protecting cloth are cut to a shape similar to that of the cover lid 1. The front side cloth piece 32 and back side cloth piece 33 are overlapped as shown in FIG. 11, and stitched together it the periphery except at the upper edges to form a bag.

The upper side of the front piece 32 extends upward beyond the upper edge of the back piece 33, and an opening 31 is formed in the front piece 32, as shown in FIGS. 10 and 11. A button is provided at the back upper part of the front piece 32 and another button is provided on the outside of the upper part of the back piece. These buttons are engageable with each other to fix the protection bag 30 to the cover lid 1. As shown in FIG. 9, the cover lid 1 of the case is inserted into the bag between the front and back cloth pieces. Then the projecting part of the cover lid, having hole 3, is passed through the opening 31 of the front cloth piece 32, and the buttons 34 and 35 are engaged with each other to secure the protection bag 30 to the cover lid 1.

In a portable case 10 in which the protection bag 30 is attached to the cover lid, the case 10 is less likely to be damaged by external impacts. Furthermore, the protection bag 30 can be easily replaced if dirty, by removing the cover lid 10 of the case body, removing the cover lid from the protection bag, and installing a new protection bag on the cover lid. Furthermore, when the cover lid 1 is linked with the case body 2, the protection bag 30 cannot comes off. Consequently, the protection bag will not become lost during use.

Figure 12:
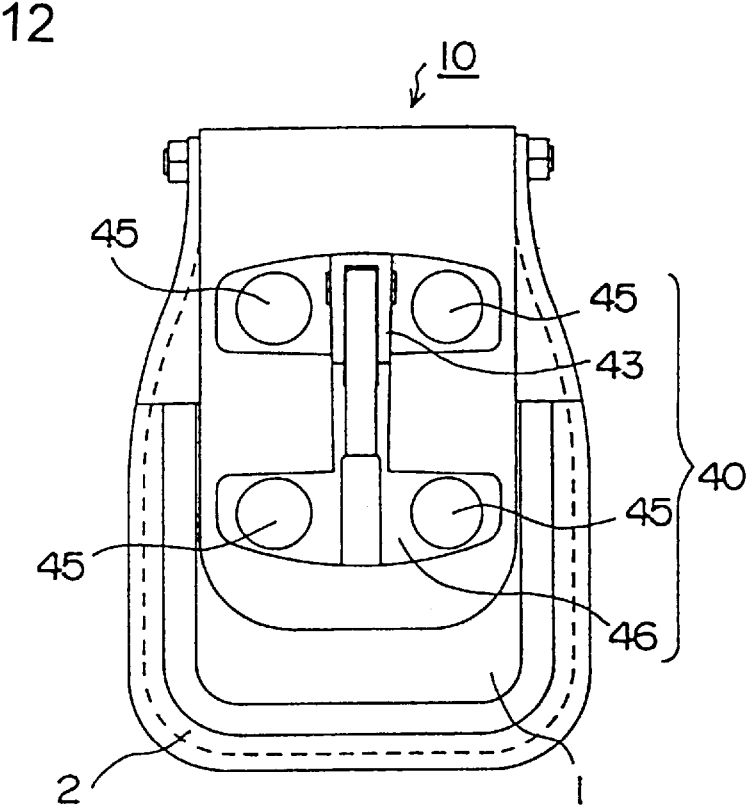
FIG. 12 is an elevational view showing an alternative embodiment of the portable case, in which the cover lid is provided with a key holder.
Figure 13:
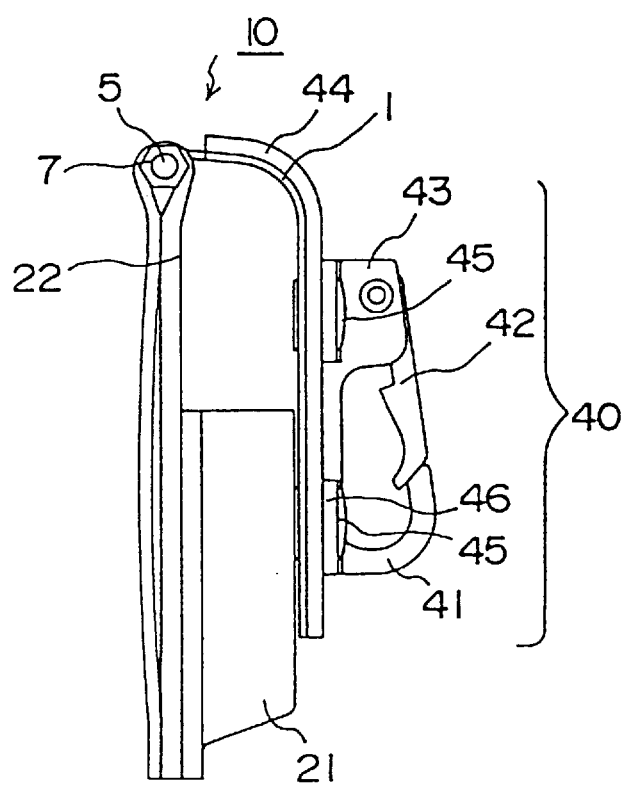
FIG. 13 is a side elevational view of the portable case of FIG. 12.
Figure 14:
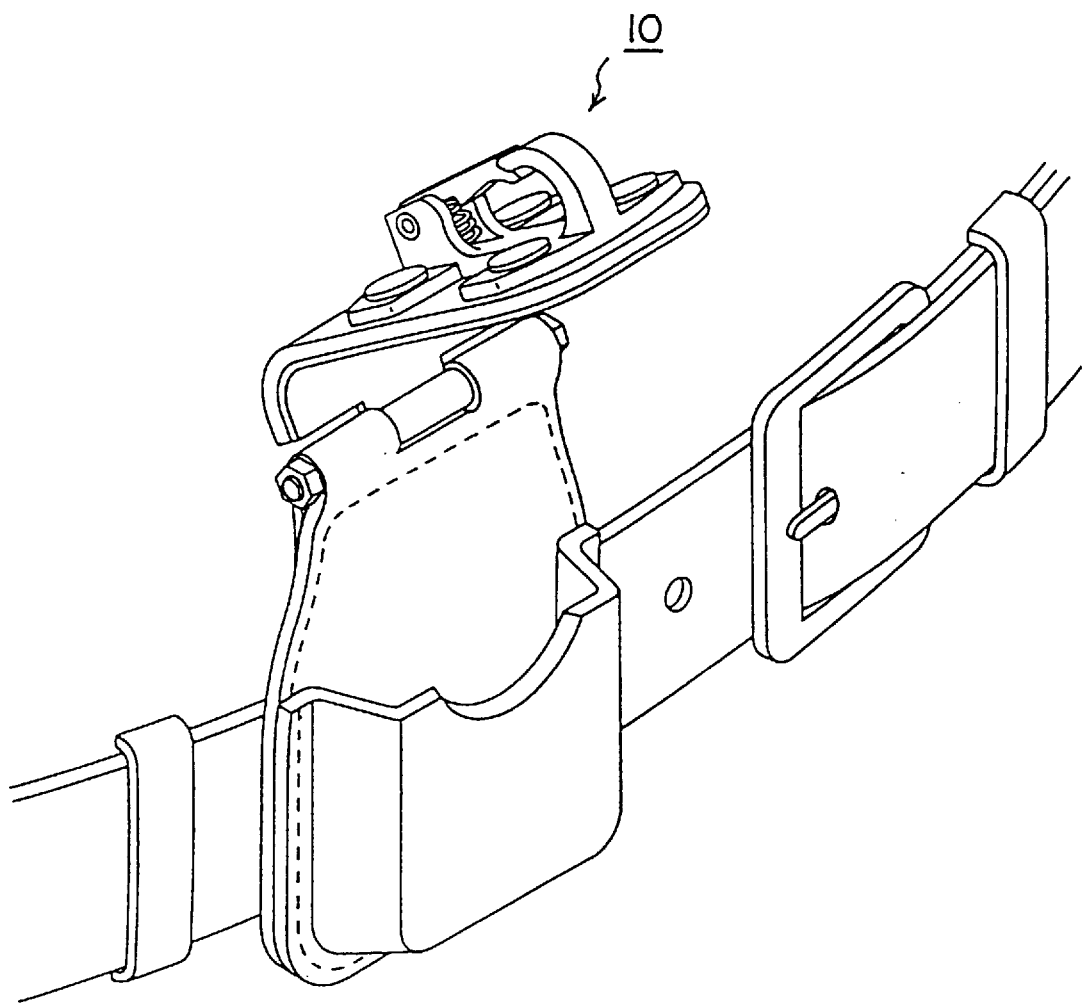
FIG. 14 is a perspective view showing the portable case of FIGS. 12 and 13 worn as a waist bag, and showing the lid cover in the opened condition.

In the embodiment of FIGS. 12–14, a key holder 40 is attached to the outside surface of the metallic cover lid 1. The key holder 40 is made of metal and is fixed to the cover lid 1 of the case 10 by four metallic pins 45.

The key holder 40 comprises an upper engaging element 42 and a lower engaging element 41. The lower engaging element 41 is fixed at the lower part of the base of key holder 40. The upper engaging element 42 is pivoted to the upper part of the base of the key holder, and is urged against the upper edge of the lower engaging element 41 by a spring incorporated in the upper part 43 of the key holder base. In the preferred embodiment, a protective leather layer 44 is provided on the cover lid 1, and the key holder 40 is attached to the cover lid 1 through the leather layer.

With the construction illustrated in FIGS. 12–14, the key holder 40 is attached at a very convenient location. Furthermore, the key holder 40 can be used as a grip to facilitate opening of the cover lid of the case.

The portable case 10 may be attached to a belt as a waist bag, as shown in FIG. 14.

The case with a key holder illustrated in FIGS. 12–14 has another important advantage in that, because the metallic key holder is attached to a metal cover lid 1, it is less likely to become detached and lost than it would be if attached directly to a non-metallic case.

Various modifications can be made to the above-described embodiments. If a part or the entirety of the cover lid 1 of the case 10 is composed of a magnet, it is possible to attach articles made of iron, or having iron components, magnetically to the cover lid. Furthermore, by attaching a magnet to the front of pocket 21 of case body 2, the metallic cover lid 1 can be attracted by the magnet so that the cover lid closes without fail and is held closed.

Figure 15:
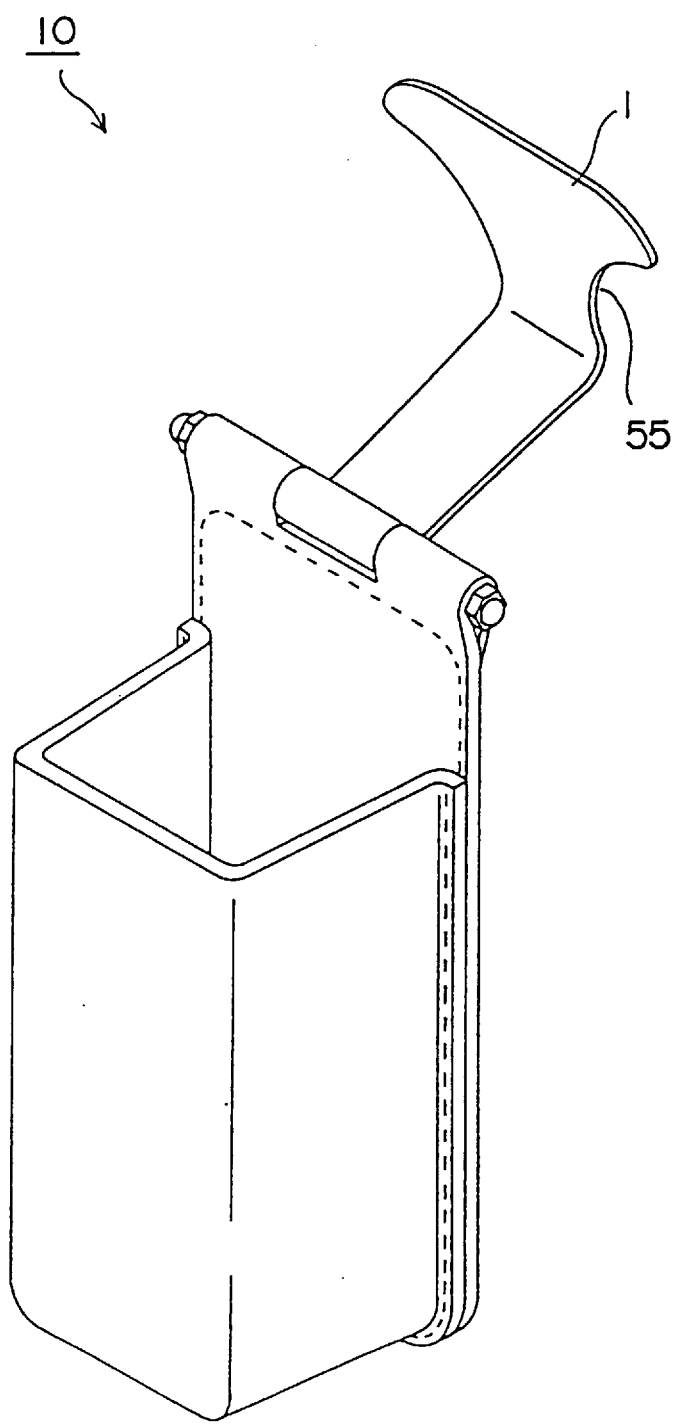
FIG. 15 is a perspective view showing an embodiment of the portable case adapted for use with a portable telephone.
Figure 16:
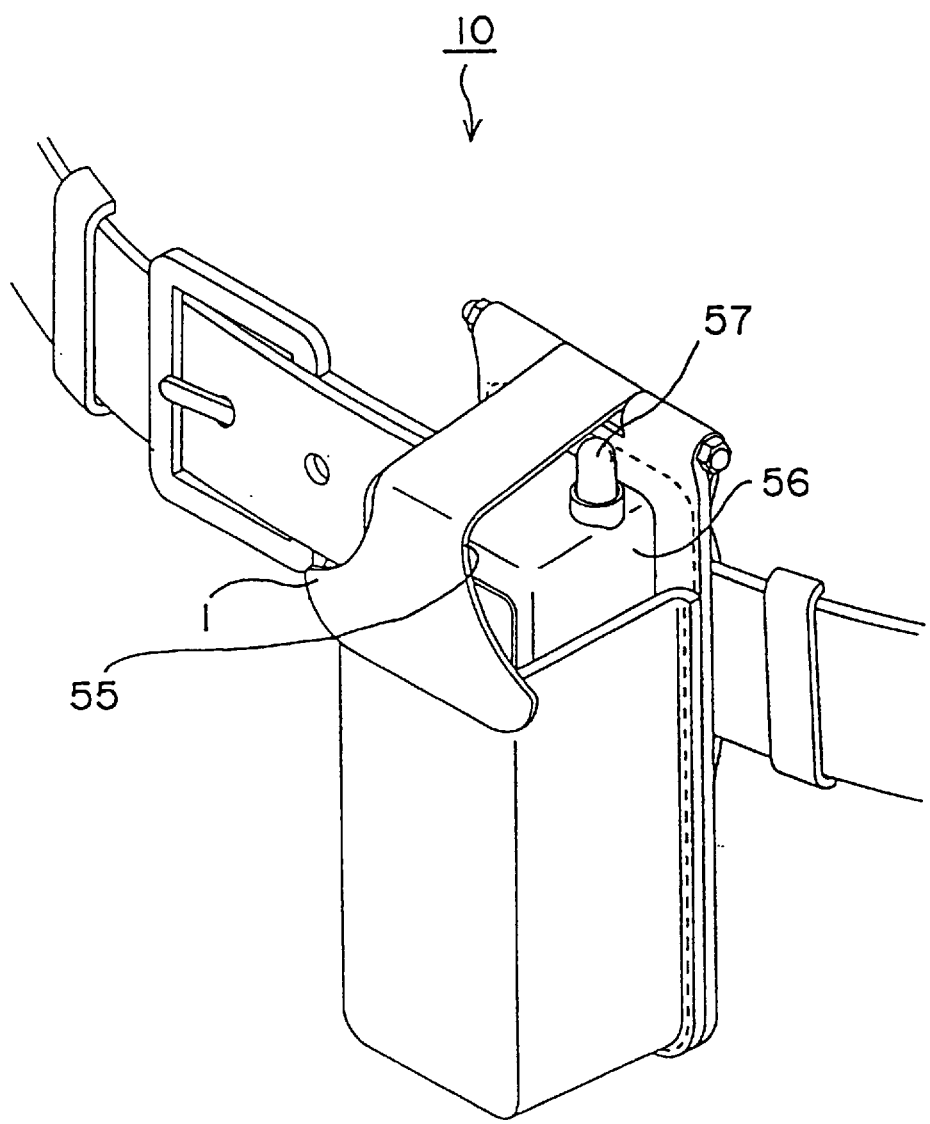
FIG. 16 is a perspective view of the portable case of FIG. 15, showing the case worn as a waist bag and holding a portable telephone.

The embodiment of FIGS. 15 and 16, is specially designed for use as a mobile telephone case. The cover lid is provided with a notch 55 at least at one of its sides to accommodate an antenna 57 of a mobile telephone 56, allowing the antenna to project upward beyond the cover lid, while the cover lid is closed. The notch provides clearance for the antenna, thereby minimizing the overall size of the case. Furthermore it allows the antenna 57 to be extended so that the portable telephone can be ready to receive an incoming signal while it is held in the portable case. The cover lid can be notched on both sides as shown in FIGS. 15 and 16, to accommodate different kinds of portable telephones, and also to allow the portable telephone to be held in the case body in either of two opposite orientations. As shown in FIG. 16 the portable mobile telephone case 10 can be worn on the person by attachment to a trousers belt. Since the cover lid 1 is made of metal, it closes due to its own weight.

Figure 17:
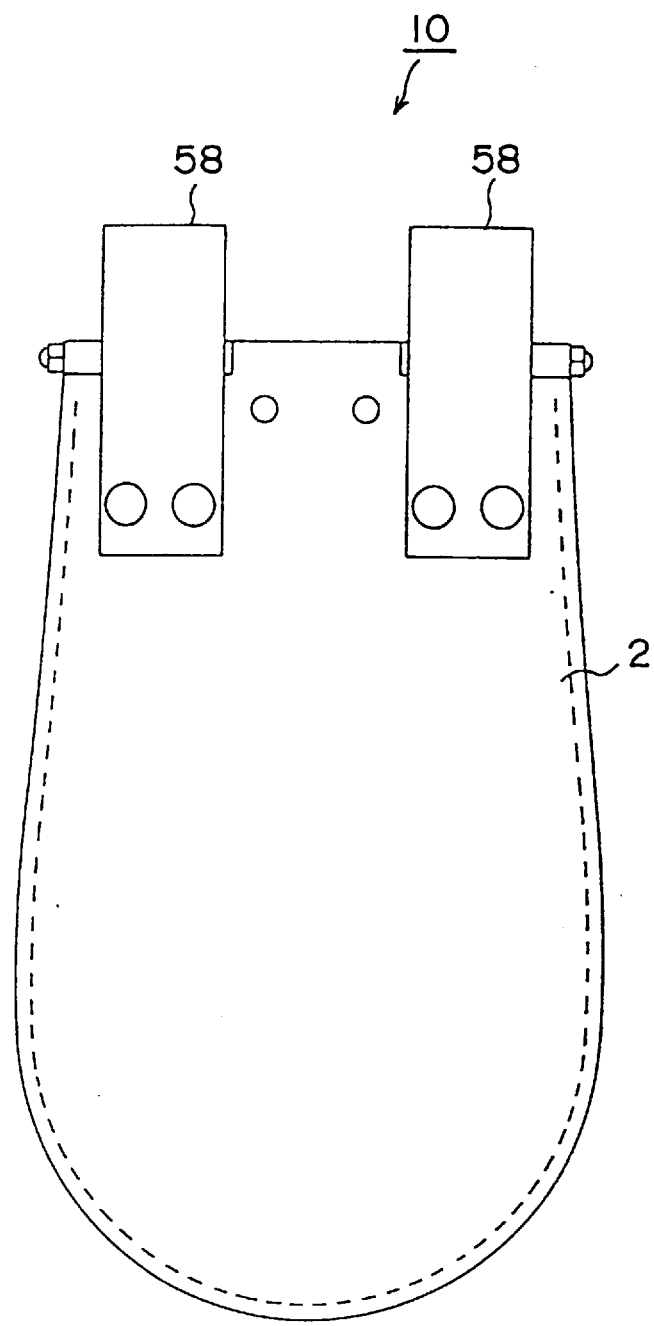
FIG. 17 is a rear elevational view of stilt another embodiment of a portable case in accordance with the invention.
Figure 18:
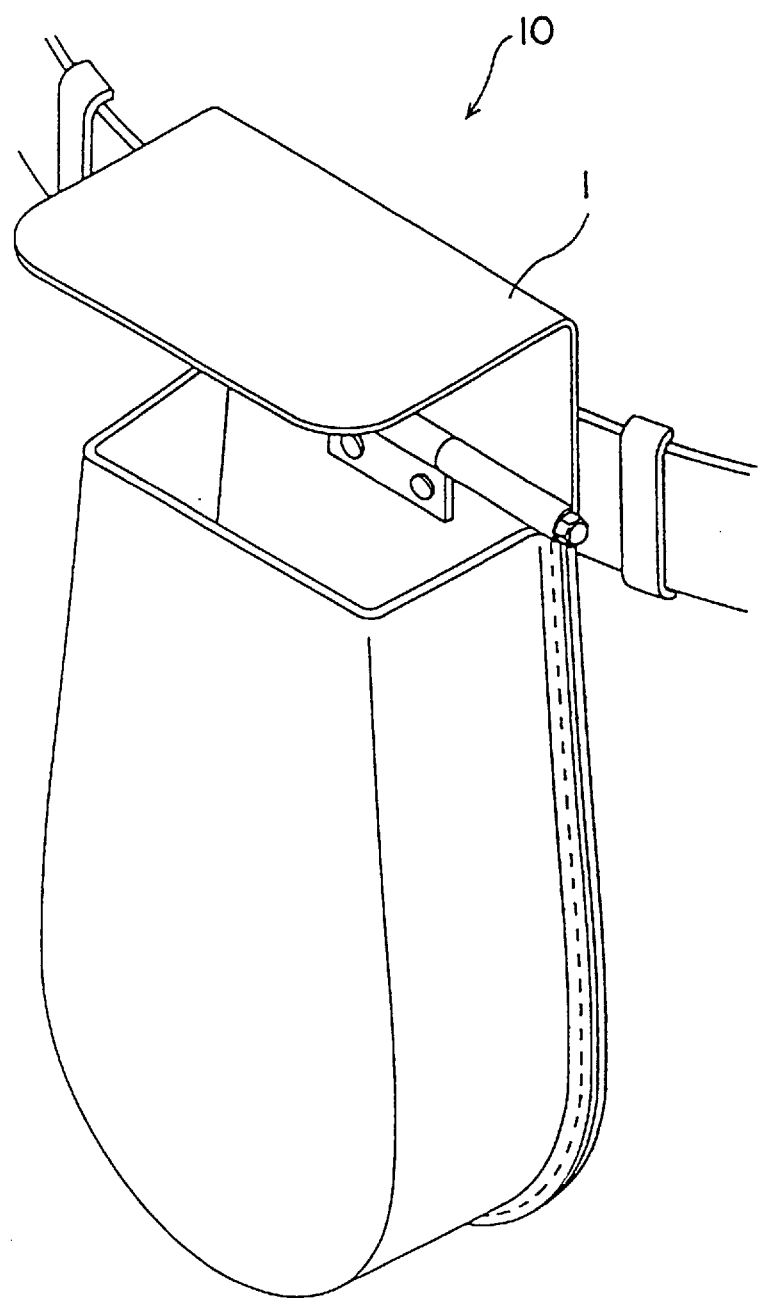
FIG. 18 is a perspective view of the portable case of FIG. 17, showing the case worn as a waist bag, and showing the cover lid in its opened condition.

In the embodiment of FIGS. 17 and 18, a portable case 10 is provided with a pair of belt loops 58 at the upper part of its back panel. The case body is shaped with a somewhat enlarge lower portion so that it serves as a waist bag with a sufficiently large capacity to enable a plurality of belongings to be accommodated within it. As shown in FIG. 18, the case 10 is supported on a trouser belt passing through the belt loops 58 (FIG. 17).

Figure 19:
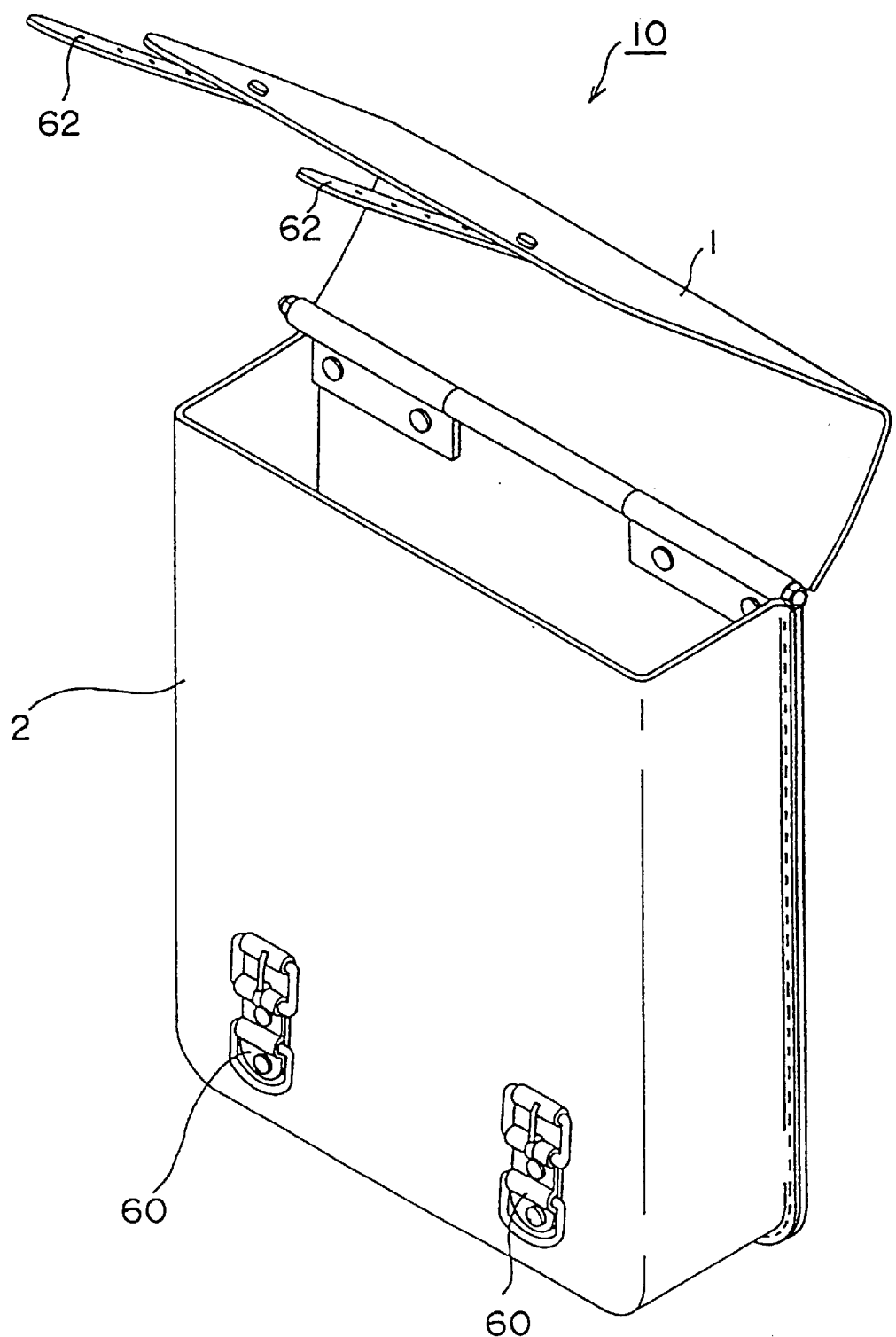
FIG. 19 is a perspective view showing still another embodiment of the portable case.

The portable case of FIG. 19 is provided with adjustable belts for securing the cover lid 1 in the closed condition on the case body. The ability to tighten and loosen the adjustable belts allows the capacity of the case to be enlarged to accommodate articles of various sizes, or different numbers of articles.

As shown in FIG. 19, belts 62 are secured to the cover lid 1 and belt-receiving buckles 60 are secured to the front face of the case body 2. The belts, and buckles make it possible to secure the cover lid 1 in its closed condition, to adjust the relationship of the cover lid to the case body, and to tighten the cover lid down on the contents of the case body when the case body is filled.

Figure 20:
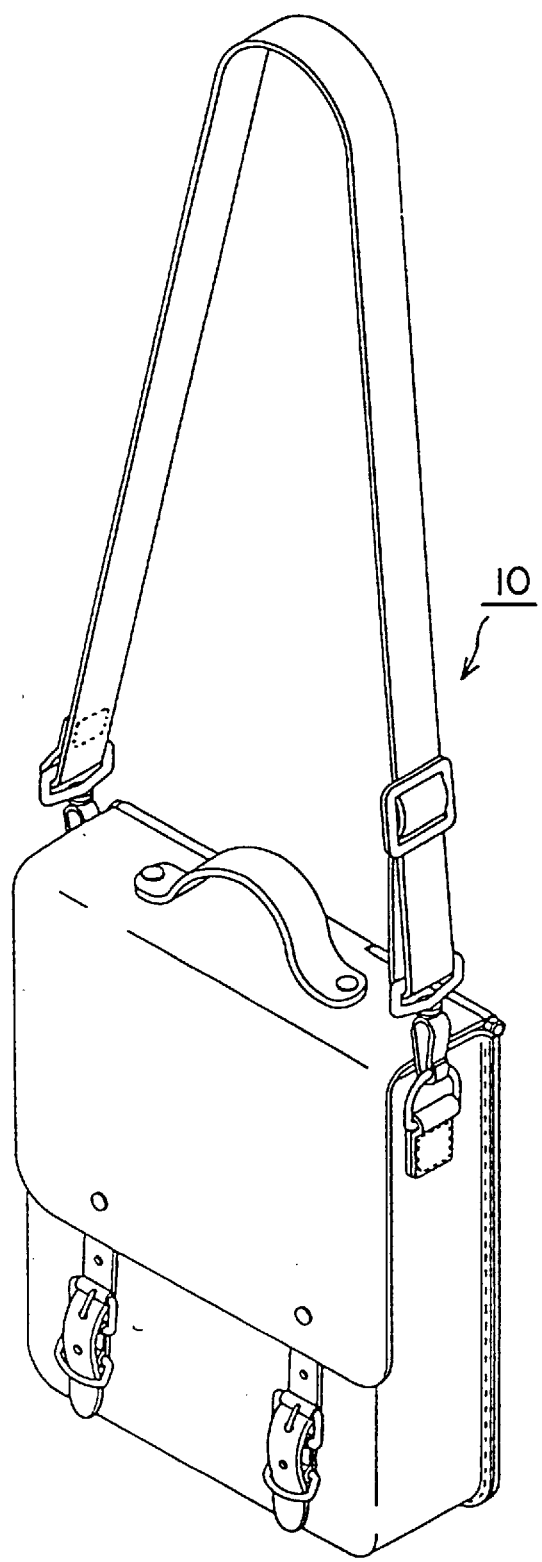
FIG. 20 is a perspective view showing a portable case similar to the one shown in FIG. 19, but adapted for use as a shoulder bag.
Figure 21:
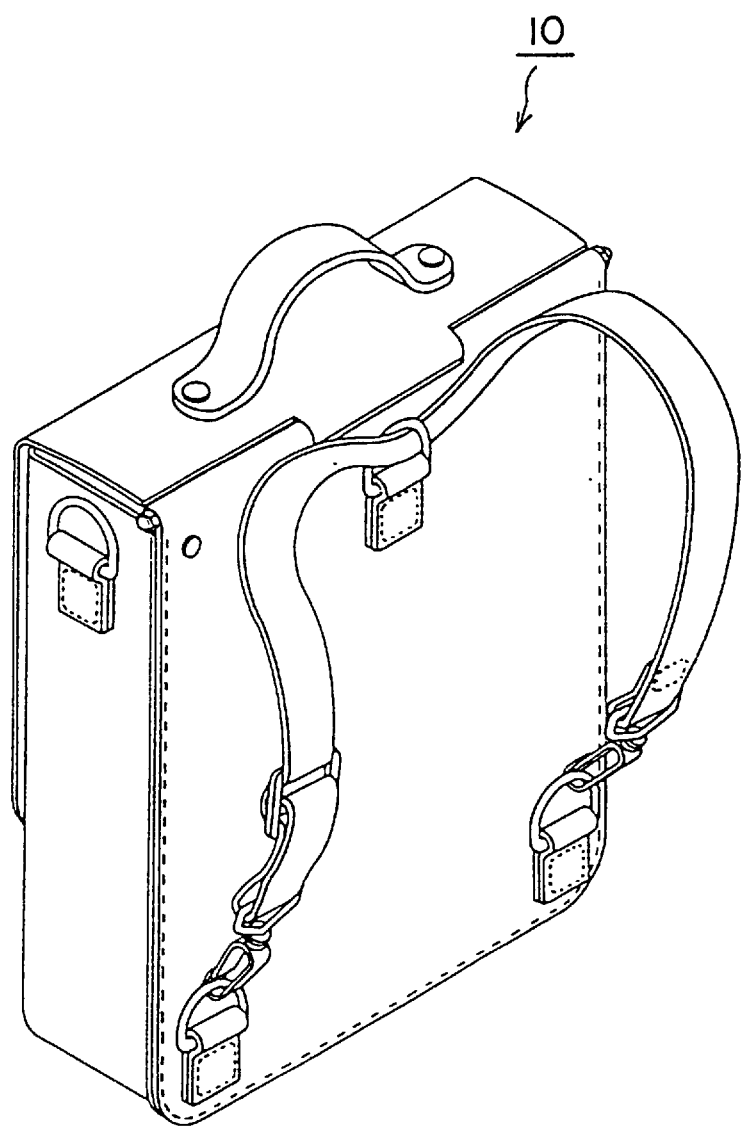
FIG. 21 showing a portable case similar to the one shown in FIG. 19, but adapted for use as a rucksack.

FIGS. 20 and 21 illustrate modifications of the case of FIG. 19 in which the case is used as a combined shoulder bag and hand bag in FIG. 20, and as a combination rucksack and hand bag in FIG. 21.

Figure 22:
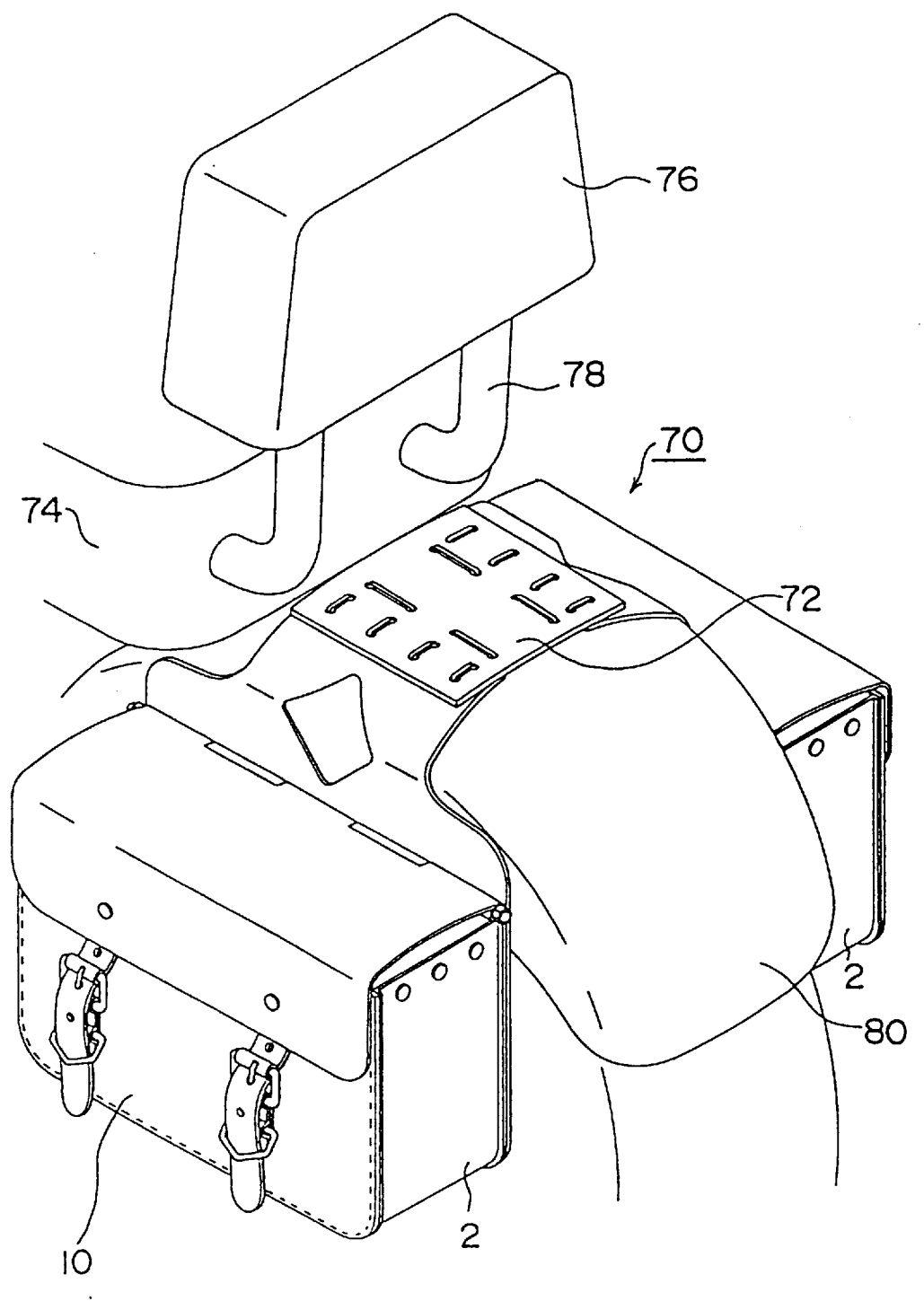
FIG. 22 is a perspective view showing a pair of accommodation cases used on a two-wheeled vehicle as panniers.

In FIG. 22, 74 is the seat of a motorcycle, 76 is the backrest, and 78 is a metallic pipe to connect the two. Behind the seat, a pair of cases having leather case bodies and metal cover lids in accordance with the invention, are used as panniers 70, the panniers being mounted on a rear wheel cover 80. The cases 2 are linked together by a linkage sheet 72 which extends over the rear wheel cover.

Figure 23:
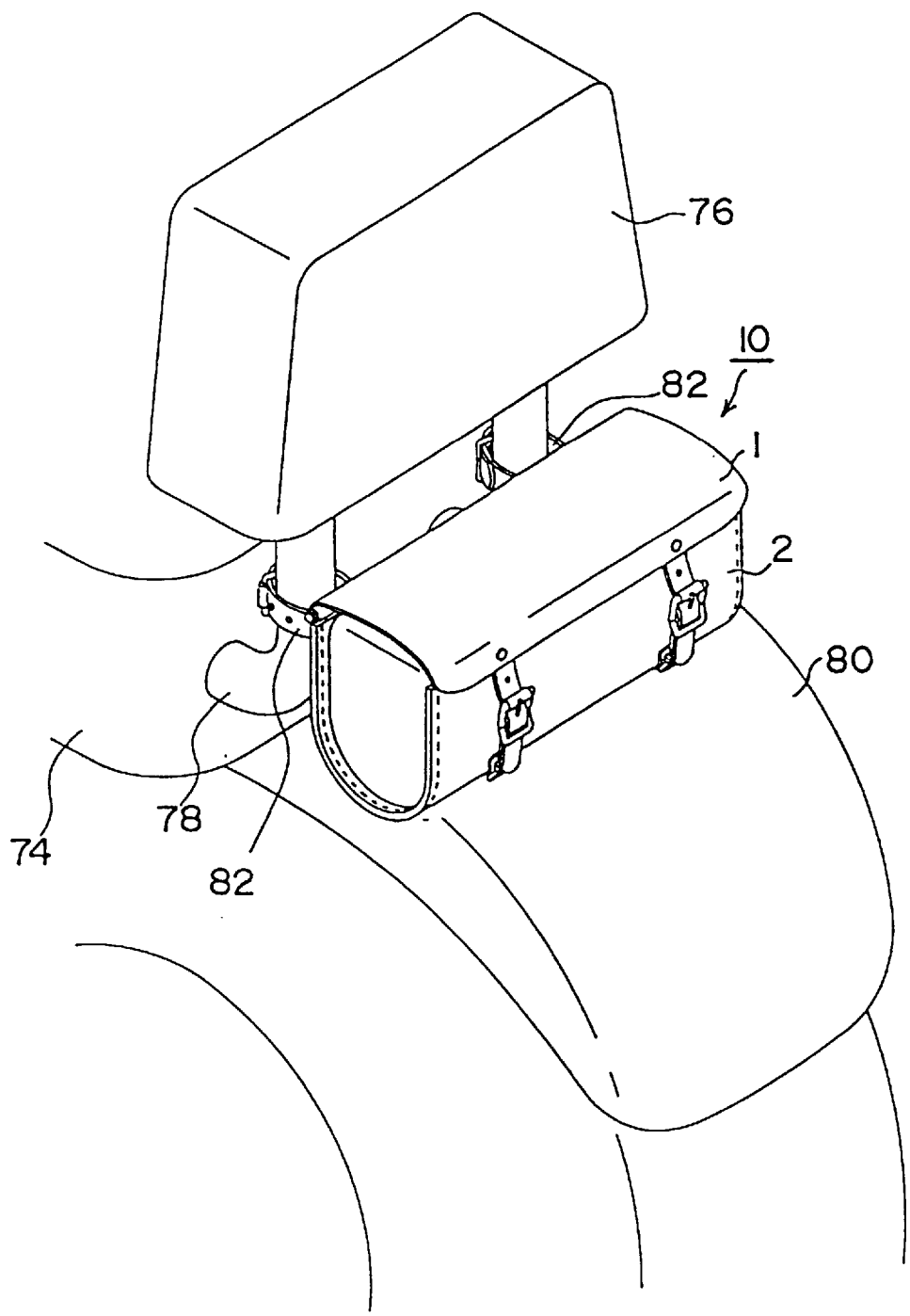
FIG. 23 is a perspective view showing another embodiment of the portable case used on a two-wheeled vehicle.

In FIG. 23, a portable case 10, having a leather case body 2 and a metal cover lid 1 according to the invention, is used as a tool bag for a motorcycle. Two belts 82 are provided at the back of the case 2 for connection to the metal pipes 78 supporting backrest 76 from seat 74. A similar portable case 10 can be used as a tool bag or article carrier for bicycles and other vehicles.

The portable case 10, having a case body of leather or imitation leather, and a cover lid of metal, has a number of advantages. A main advantage is the easy replaceability of the cover lid. The case body can also be replaced, when necessary. As shown in FIGS. 5 and 13, when the cover lid 1 is closed, the front part 21 of the case body is brought into facial contact with the cover lid 1. That is, when the cover lid 1 is closed, the planar inside surface of the cover lid 1 is parallel to and in area contact with the planar outside surface of the front part 21 of the case body. With the respective surfaces in facial contact with each other, the closed condition of the case can be well retained.

In the embodiments of FIGS. 1–14, the height of the pocket of the case body 2 is roughly half to two-thirds the height of the rear panel 22. Consequently air is allowed to waft freely through the upper part of the case 10. Since a good ventilation is provided, any remaining heat generated by a cigarette lighter, can be easily dissipated.

Furthermore, especially when the case is used as a lighter case, the cover lid 1 extends away from the pin on which it is pivoted and is bent through about 90 degrees so that its front part is brought into contact with the front part 21 of the pocket of the case body. This configuration of the cover lid provides a large space at the upper part of the case.

As described above, a portable case, and accommodation case to be used on a two-wheeled vehicle according to the invention ensure that, with a simple construction, the service life of the case is lengthened and the case is more resistant to the effects of external impacts.

What is claimed is:

1. A portable case for belongings, comprising a case body for accommodating belongings and a cover lid to protect the belongings, wherein the case body is made of leather and has an outwardly facing front face and a top opening, the cover lid is made of metal and comprises a first portion connected to the case body and capable of overlying the top opening of the case body, and a second portion capable of being brought into facial contact with said front face of the case body, and the case body and cover lid are disconnectable from each other without destroying any part of the case body, whereby either can be replaced.

2. A portable case for belongings as set forth in claim 1, having a hinge with a hinge axis and wherein the case and cover lid are hinged together by the hinge, whereby the cover lid can be rotated between an opened and a closed condition about the hinge axis.

3. A portable case for belongings as set forth in claim 2, wherein the hinge comprises a metal pin attached to the case body and extending along the hinge axis, and in which the cover lid includes at least one knuckle through which the pin extends.

4. A portable case for belongings as set forth in claim 3, wherein the metal pin has threaded ends, and including a nut threaded onto each end of the metal pin for fixing the pin to the case body.

5. A portable case for belongings, as set forth in claim 1 wherein at least a part of the cover lid is made of a magnet.

6. A portable case for belongings as set forth in claim 1 in which the cover lid comprises a ferromagnetic material, and including a magnet attached to the case body, whereby the cover lid can be held closed by the action of the magnet.

7. A portable case for belongings as set forth in claim 1 including a protective cloth attached to and covering at least part of said cover lid.

8. A portable case for belongings as set forth in claim 1, in which the first and second portions of the cover lid are unitary and connected to each other by a bend, whereby the cover lid is L-shaped.

9. A portable case for belongings as set forth in claim 1, in which first and second portions of the cover lid are unitary and connected to each other by a bend of about 90 degrees, whereby the cover lid is L-shaped.

10. A portable case for belongings as set forth in claim 1 in which the case body comprises a rear panel having a front face with upper and lower parts, and a pocket secured to the lower part of the front face of the rear panel, whereby a through space for the flow of air across the pocket is provided between the pocket and the cover lid even when the cover lid is closed.

11. A portable case for belongings as set forth in claim 1 in combination with a cigarette lighter, wherein the case body receives said cigarette lighter.

12. A portable case for belongings as set forth in claim 1, in which the first and second portions of the cover lid are unitary and connected to each other by a bend, whereby the cover lid is L-shaped, and in which the first portion of the cover lid is connected to the case body at a location above the top opening of the case body such that, when the second portion of the cover lid is in facial contact with the front face of the case body, the first portion of the cover lid is located above, and spaced from, the top opening of the case body.

13. A portable case for belongings as set forth in claim 1 in which the case body has a rear face, and having a belt loop secured to the rear face of the case body, whereby the portable case can be worn as a waist bag.

* * * * *